United States Patent
Shinoda et al.

(10) Patent No.: US 6,594,162 B2
(45) Date of Patent: Jul. 15, 2003

(54) INVERTER DEVICE

(75) Inventors: Hisanobu Shinoda, Kobe (JP); Yoshio Kayumi, Nagasaki (JP); Tetsuro Shigemizu, Nagasaki (JP); Masato Goto, Nagasaki (JP); Atsushi Takemura, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/075,447

(22) Filed: Feb. 15, 2002

(65) Prior Publication Data

US 2002/0075703 A1 Jun. 20, 2002

Related U.S. Application Data

(63) Continuation of application No. PCT/JP01/05149, filed on Jun. 15, 2001.

(30) Foreign Application Priority Data

Jun. 16, 2000 (JP) ........................................ 2000-181959

(51) Int. Cl.[7] ................................................ H02M 1/12
(52) U.S. Cl. ............................ 363/40; 363/41; 318/811
(58) Field of Search .............................. 363/40, 39, 41, 363/131, 132, 97, 98; 318/811, 810, 812, 729

(56) References Cited

U.S. PATENT DOCUMENTS

| 4,249,120 A | * | 2/1981 | Earle .......................... 318/729 |
| 4,656,572 A | * | 4/1987 | Caputo et al. ................. 363/41 |
| 4,870,556 A | * | 9/1989 | Inaba et al. ................... 363/41 |
| 6,049,474 A | * | 4/2000 | Platnic ......................... 363/98 |

FOREIGN PATENT DOCUMENTS

| JP | 62-285666 | 12/1987 |
| JP | 3-40763 | 2/1991 |

* cited by examiner

*Primary Examiner*—Rajnikant B. Patel
(74) *Attorney, Agent, or Firm*—Oblon, Spivak, McClelland, Maier & Neustadt, P.C.

(57) ABSTRACT

The inverter device includes an inverse conversion circuit which converts a supplied direct-current electricity into a alternating-current electricity having a predetermined frequency, and is designed to drive a motor for a rotary machine, at various speeds, in which the switching control of the inverse conversion circuit is performed by a digital processor. In this inverter device, a timer interrupt process having an independent constant processing cycle which is not directly related to the processing cycle of the system control in the digital processor is assigned. In the timer interrupt process, whether or not switching of the inverse conversion circuit is required is determined, and the switching control is carried out on the basis of the determination.

3 Claims, 5 Drawing Sheets

INVERTER DEVICE

CROSS REFERENCE TO RELATED APPLICATIONS

This is a Continuation Application of PCT Application No. PCT/JP01/05149, filed Jun. 15, 2001, which was not published under PCT Article 21(2) in English.

This application is based upon and claims the benefit of priority from the prior Japanese Patent Application No. 2000-181959, filed Jun. 16, 2000, the entire contents of which are incorporated herein by reference.

BACKGROUND OF THE INVENTION

1. Field of the Invention

The present invention relates to an inverter device for driving a motor serving as a power source of a rotary machine such as a fan, pump, mill and crane, at various speeds, and more specifically to a remodeled version of the control mode.

2. Description of the Related Art

FIG. 1 is a block diagram showing a structure of a conventional current-type inverter device which can drive a power source motor for rotary machine, at various speeds.

A main circuit portion A includes a commercially available alternating power source 1, an alternating-direct forward conversion circuit 2, a smoothing direct-current reactor 3 and a direct-alternating inverse conversion circuit 4. An alternating current output from the inverse conversion circuit 4 is supplied to a motor 11 serving as a power source for rotating a rotary machine load 12.

It should be noted that the inverse conversion circuit 4 has a structure in which six semiconductor switching elements (thyristors) 5 to 10 are connected in bridge. More specifically, the semiconductor switching elements 5 and 6 are provided to correspond to upper and lower arms in pair for a U-phase in the figure. Similarly, the semiconductor switching elements 7 and 8 are provided to correspond to a pair of arms for a V-phase, and the semiconductor switching elements 9 and 10 are provided to correspond to a pair of arms for a W-phase. With this structure, positive and negative currents corresponding to each of the U-phase, V-phase and W-phase are extracted from the mid-connection point between a pair of semiconductor switching elements in a respective phase.

A control circuit unit B includes an I/O unit 17 which relays input/output signals, a system control unit 14 which outputs an output voltage command Vdcs and a frequency command fos on the basis of an external signal Sx input from an external input terminal 13, a switching control unit 15 which controls the switching of the inverse conversion circuit 4 with use of an ON-OFF control signal Sc generated on the basis of the frequency command fos, and a forward conversion control unit 19 which controls an output voltage from the forward conversion circuit 2 on the basis of the output voltage command Vdsc. The system control unit 14 and the switching control unit 15 are contained in a processor 16, and the processor 16 and the I/O unit 17 for relaying input/output signals are contained in a digital control device 18.

FIGS. 2A and 2B are diagrams illustrating the operation of an electrical current type inverter device shown in FIG. 1. FIG. 2A is a diagram showing the ON-OFF state of each of the six semiconductor switching elements 5 to 10 in the inverse conversion circuit 4 in the case where the above device is operated in a "120° conduction mode". FIG. 2B is a diagram illustrating inverter output current waveforms obtained by the ON-OFF operations of the semiconductor switching elements 5 to 10.

More specifically, in a "120° conduction mode", the six semiconductor switching elements 5 to 10 of the inverse conversion circuit 4 in the electrical current type inverter device are turned on one after another as shown in FIG. 2A. As a result, the phase currents are output each for a period of 120° with respect to an output cycle (1 cycle=360°) as shown in FIG. 2B. In this case, the frequency of the output current is controlled by increasing/decreasing the timing width P shown in FIG. 2A.

FIG. 3 is an explanatory diagram illustrating a digital control processing mode in a processor 16 of the electrical current-type inverter device shown in FIG. 1. First, the system control unit 14 starts to operate on the basis of an external signal Sx containing, for example, a request from outside or conditions for the load device. Thus, a processing cycle Tc (Tc1, Tc2 . . . ) of system control which calculates the output voltage command Vdcs and the frequency command fos, that is, the processing cycle for the processor 16, is measured. Subsequently, it is determined whether or not the ON-OFF switching is required in the six semiconductor switching elements 5 to 10 at the time where each of the processing cycles Tc1, Tc2, . . . , is finished. Then, on the basis of the determination, the ON-OFF switching control for the semiconductor switching elements 5 to 109 is executed, and thus the output frequency fo of the inverse conversion circuit 4 is controlled.

In a conventional digital control processing mode illustrated in FIG. 3, the ON-OFF switching control is carried on the six semiconductor switching elements 5 to 10 for each of the processing cycles Tc1, Tc2, . . . of the system control in the processor 16. Therefore, when the time width of each of the processing cycles Tc1, Tc2, . . . , is expanded, the time density (resolution) for determining whether or not the switching is required, is decreased, and the control accuracy for the actual output frequency fo is lowered.

Further, the processing cycles Tc1, Tc2, . . . of the system control unit 14 may vary due to several factors, and therefore the switching control which is carried out based on the cycles Tc1, Tc2, . . . , which are taken as the timing references, will have a problem of a decrease in accuracy in the actual output frequency fo, which causes an unbalance in the output current waveform. In order to prevent the occurrence of such a problem, the conventional technique needs to employ a process exclusively for inverter control or a digital control device, having a special hardware structure, in order to control the timing for switching the ON-OFF switches of the six semiconductor switching elements 5 to 10.

In the meantime, the timing for the ON-OFF switching control for the semiconductor switching elements 5 to 10 is determined on the basis of the present phase angle θ where one cycle with respect to the angular frequency command value ω (=2πfo) is set to be 2π (radian), and with regard to the elapsed time t, a relationship of $\theta = \int \omega \times t$ is established. However, when the phase angle is obtained from the frequency order fos on the basis of $\theta' = \omega \times t$ at an end of each of the processing cycles Tc1, Tc2, . . . , of the system control, there results an error between the actual phase angle θ and the obtained one if the angular frequency command ω varies. Therefore, the control accuracy of the actual output frequency fo is lowered.

The object of the present invention is to provide an inverter device having the following advantages.

That is, it is possible to supply an alternating current output having a highly accurate and stable frequency, regardless of the processing cycle of the system control by the processor.

Further, the frequency control accuracy is not lowered even if the output frequency is varied as in an acceleration or deceleration.

BRIEF SUMMARY OF THE INVENTION

In order to achieve the above-described object, the inverter device of the present invention is made to have the following structure.

(1) The inverter device of the present invention includes an inverse conversion circuit which converts a supplied direct-current electricity into a alternating-current electricity having a predetermined frequency, and is designed to drive a power source motor for rotary machine, at various speeds, in which the switching control of the inverse conversion circuit is performed by a digital processor. In this inverter device, a timer interrupt process with independent constant processing cycle which is not directly related to the processing cycle of the system control in the digital processor is assigned. In the assigned timer interrupt process, whether or not switching of the inverse conversion circuit is required is determined, and the switching control is carried out on the basis of the determination. In this manner, the inverter output frequency is controlled.

(2) An inverter device of the present invention according to the one recited in (1), is characterized in that the constant processing cycle in the timer interrupt process is set shorter than an average processing cycle in the system control.

(3) An inverter device of the present invention according to the one recited in (1), further comprises means for determining whether or not the switching control is required on the basis of the current phase obtained by converting the frequency set value into a phase increment amount to be set in the timer interrupt cycle, and totalizing the set value in the timer interrupt process, thus grasping the current phase.

DETAILED DESCRIPTION OF THE INVENTION (Structure)

Figure 1:
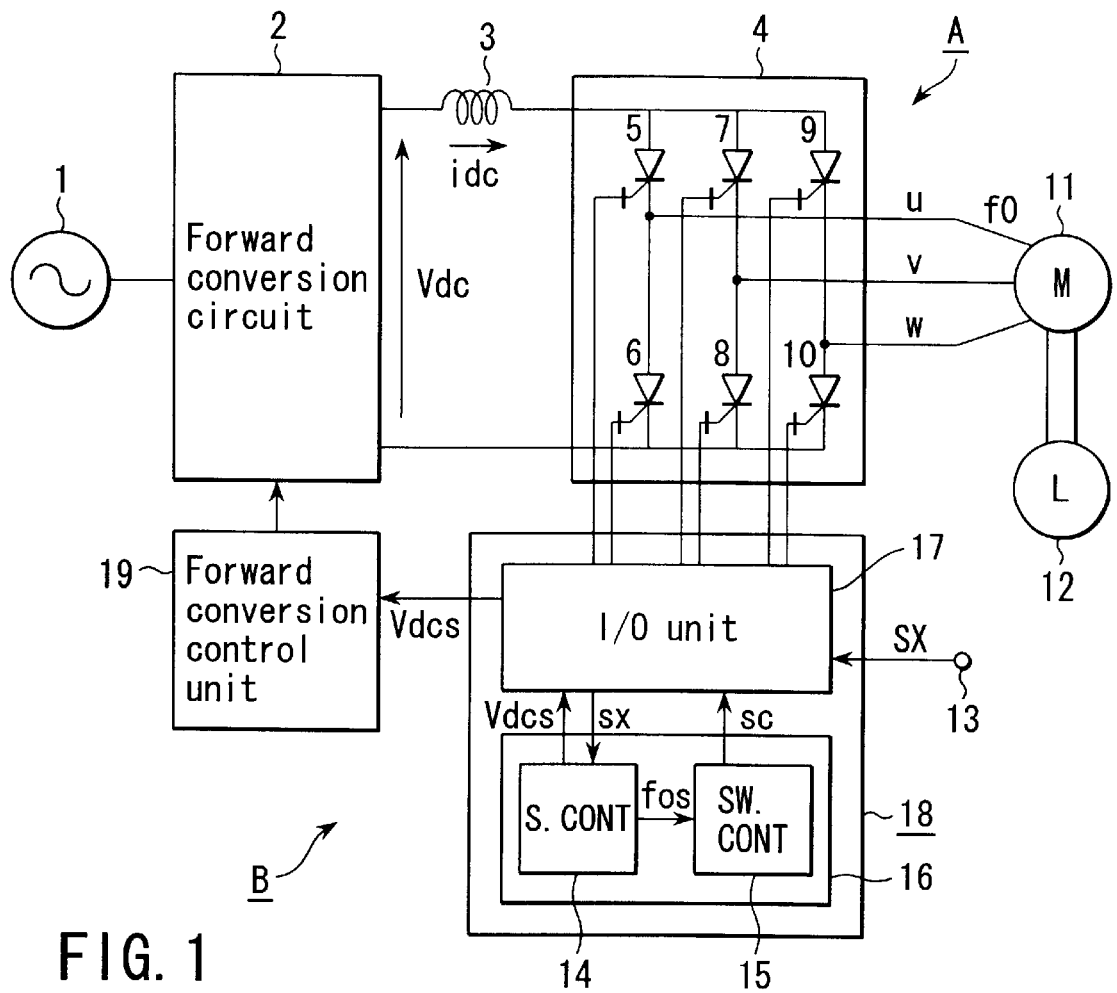
FIG. 1 is a block diagram showing the structure of the conventional inverter device.
Figure 3:
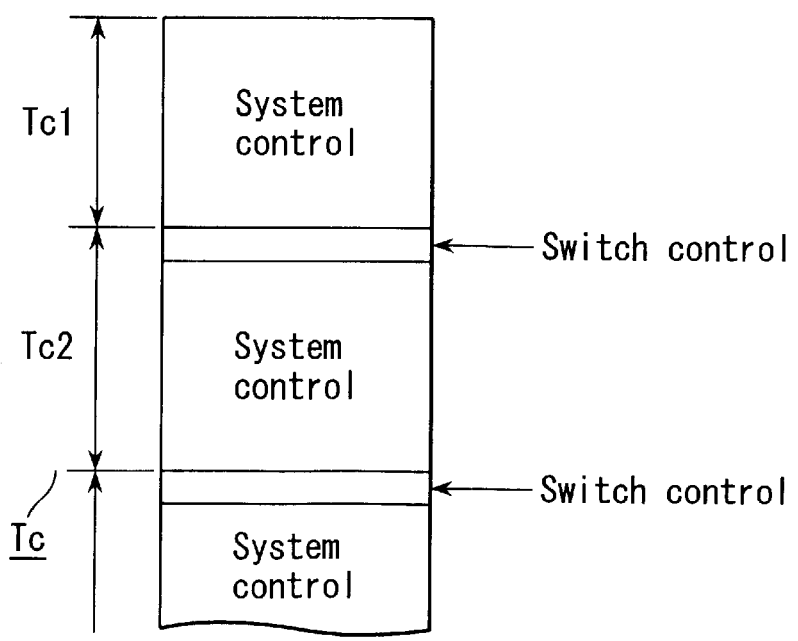
FIG. 3 is an explanatory diagram illustrating the digital control processing mode in the digital processor of the conventional inverter device.
Figure 4:
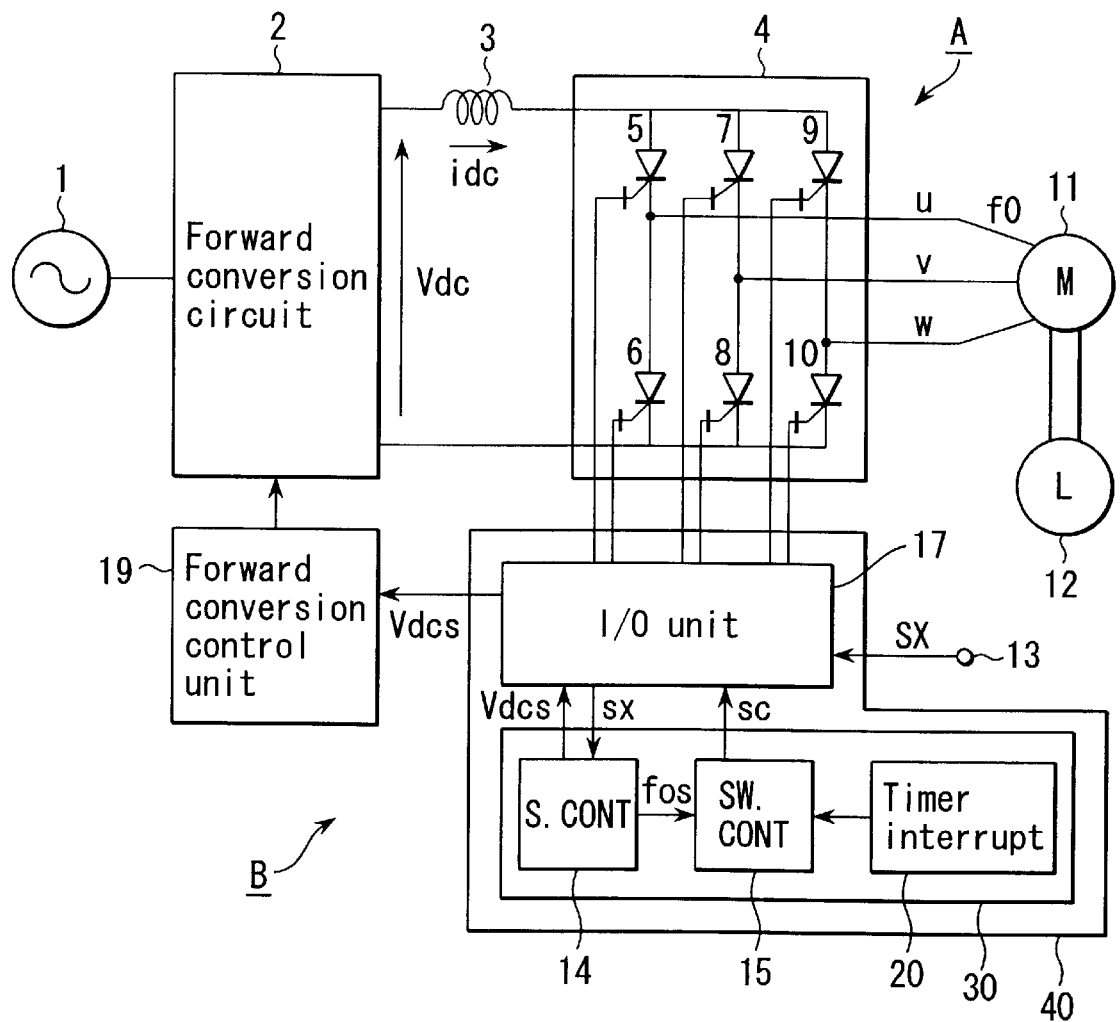
FIG. 4 is a block diagram showing the structure of the inverter device according to an embodiment of the present invention.

FIG. 4 is a diagram showing the structure of the inverter device according to an embodiment of the present invention, and more specifically it is a block diagram illustrating the structure of the current-type inverter device which can drive a power source motor for rotary machine, at various speeds. It should be noted that those structural elements which have the same functions as those of the conventional current-type inverter device shown in FIG. 1 are designated by the same reference numerals.

The current-type inverter device shown in FIG. 4 includes mainly a main circuit unit A and a control circuit unit B.

The main circuit unit A includes a forward conversion circuit 2 for converting an alternating current from a commercially-available alternating current power source 1 into a direct-current electricity, a direct-current reactor 3 for smoothing a direct-current electricity converted in a forward direction by the forward conversion circuit 2 and a inverse conversion circuit 4 for converting the direct-current electricity smoothed by the direct-current reactor 3 into an alternating-current electricity of a predetermined frequency. An alternating-current electricity output from the inverse conversion circuit 4 is supplied to the motor 11. The motor 11 is a power source for rotating a rotary machine load 12 such as a fan, pump, mill or crane.

It should be noted that the inverse conversion circuit 4 has a structure in which the six semiconductor switching elements (thyristors) 5 to 10 are connected in a bridge manner. More specifically, in the inverse conversion circuit 4, the semiconductor switching elements 5 and 6 are provided to correspond to upper and lower arms in pair for a U-phase in the figure. Similarly, the semiconductor switching elements 7 and 8 are provided to correspond to a pair of arms for a V-phase, and the semiconductor switching elements 9 and 10 are provided to correspond to a pair of arms for a W-phase. With this structure, positive and negative currents corresponding to each of the U-phase, V-phase and W-phase are extracted from the mid-connection point between a pair of semiconductor switching elements in a respective phase.

A control circuit unit B includes an I/O unit 17 which relays input/output signals, a system control unit 14 which outputs an output voltage command Vdcs (a command for the output voltage Vdc of the forward conversion circuit 2) and a frequency command fos (a command for the output frequency fo of the inverse conversion circuit 4) on the basis of an external signal Sx containing an external command, a load state detection data or the like, input from an external input terminal 13 via the I/O unit 17, a switching control unit 15 which generates an ON-OFF control signal Sc having a predetermined timing on the basis of the frequency command fos from the system control unit 14, and controls the ON-OFF switching of the inverse conversion circuit 4 by applying the ON-OFF control signal Sc to the gates of the six semiconductor switching elements 5 to 10 of the inverse conversion circuit 4 via the I/O unit 17, a forward conversion control unit 19 which controls the forward conversion circuit 2 on the basis of the output voltage command Vdsc, and a timer interrupt process control unit 20.

The system control unit 14, the switching control unit 15 and the timer interrupt process control unit 20 are contained in a digital processor 30, and the processor 30 and the I/O unit 17 for relaying input/output signals are contained in a digital control device 40.

Figure 5:
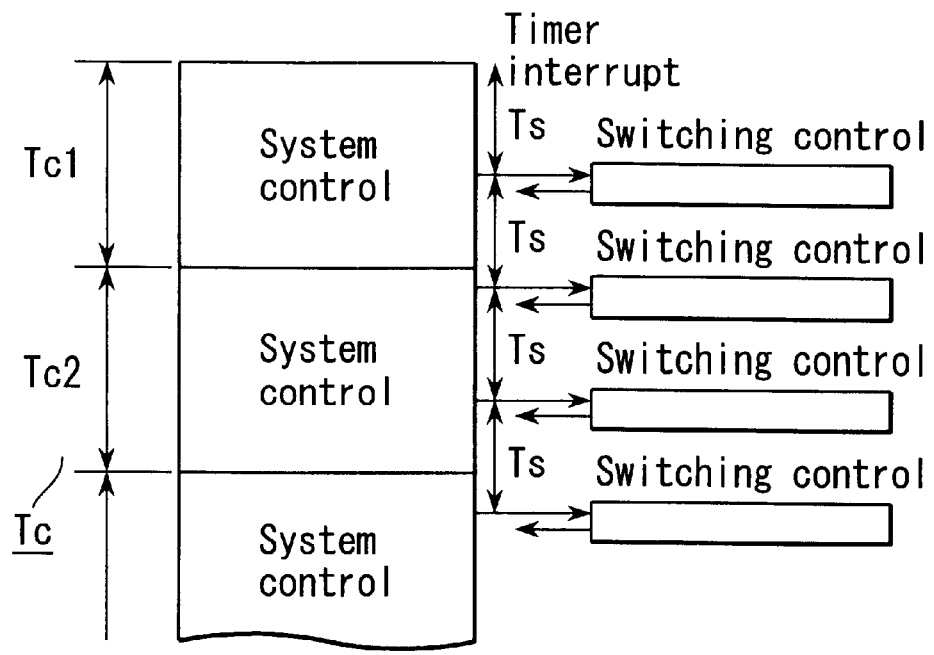
FIG. 5 is an explanatory diagram illustrating the digital control processing mode in the digital processor of the inverter device according to the embodiment of the present invention.

FIG. 5 is an explanatory diagram for the digital control processing mode employed in the digital processor 30 which contains the system control unit 14 for calculating the output voltage command Vdcs and the frequency command fos, the switching control unit 15 for controlling the ON-OFF switching of the six semiconductor switching elements 5 to 10 and the timer interrupt process controlling unit 20.

Figure 2A:
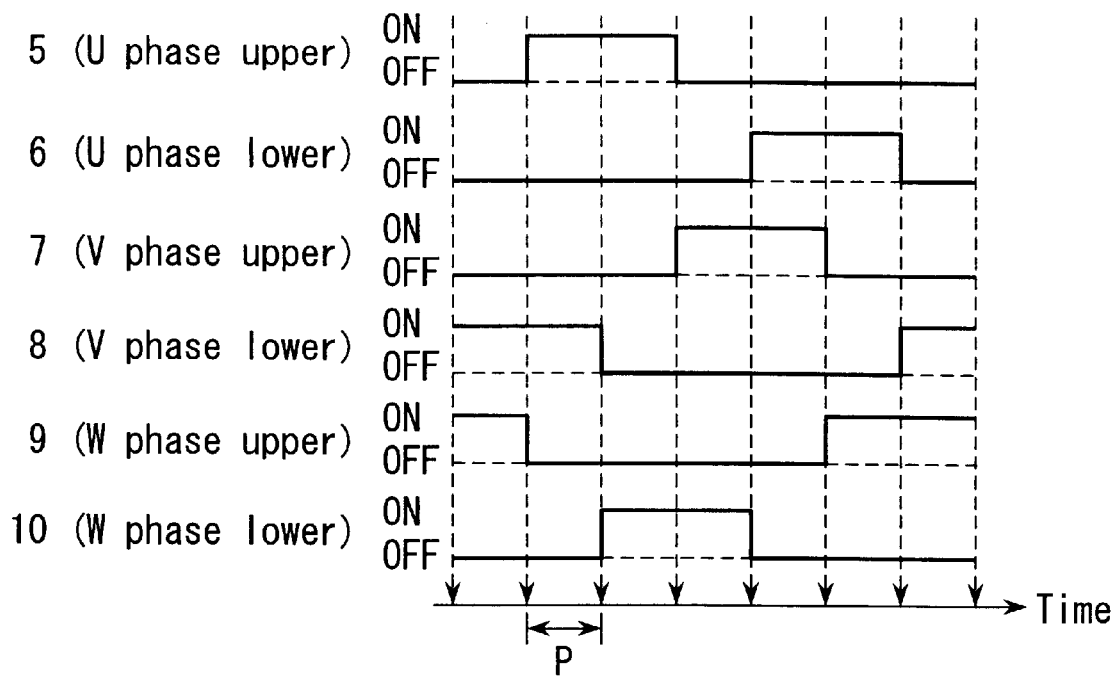
FIG. 2A is an explanatory diagram illustrating the operation of the conventional inverter device, and more specifically, indicating the ON-OFF state of the semiconductor switching element when the device is operated in the "120° conduction mode"
Figure 2B:
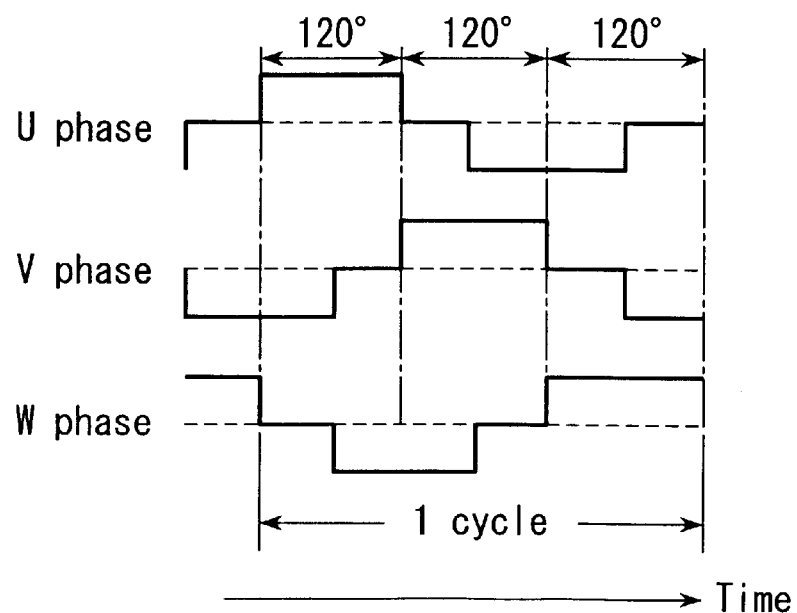
FIG. 2B is an explanatory diagram illustrating the operation of the conventional inverter device, and more specifically, indicating the inverter output current waveforms obtained as results of ON-OFF operations of the semiconductor switching element.

In the digital control processing mode shown in FIG. 2, a timer interrupt process is assigned and the process has an independent and constant processing cycle Ts (the processing cycle Ts is set to be shorter than an average of the processing cycles Tc1, Tc2, of the system control), which is not directly related to the processing cycle Tc (Tc1, Tc2, ...) of the system control in the processor 30. With this structure, a timer interrupt occurs for each of the constant processing cycles Ts. Thus, in an execution of the system control in the main loop by the system control unit 14, it is determined whether or not the switching control in the timer interrupt process in the main loop in the system control unit 14, that is, the ON-OFF switching of each of the six semiconductor switching elements 5 to 10 in the inverse conversion circuit 4, is required. Then, on the basis of the result of the determination, the ON-OFF switching of each of the six semiconductor switching elements 5 to 10 is carried out and thus the inverter output frequency fo is controlled.

Figure 6:
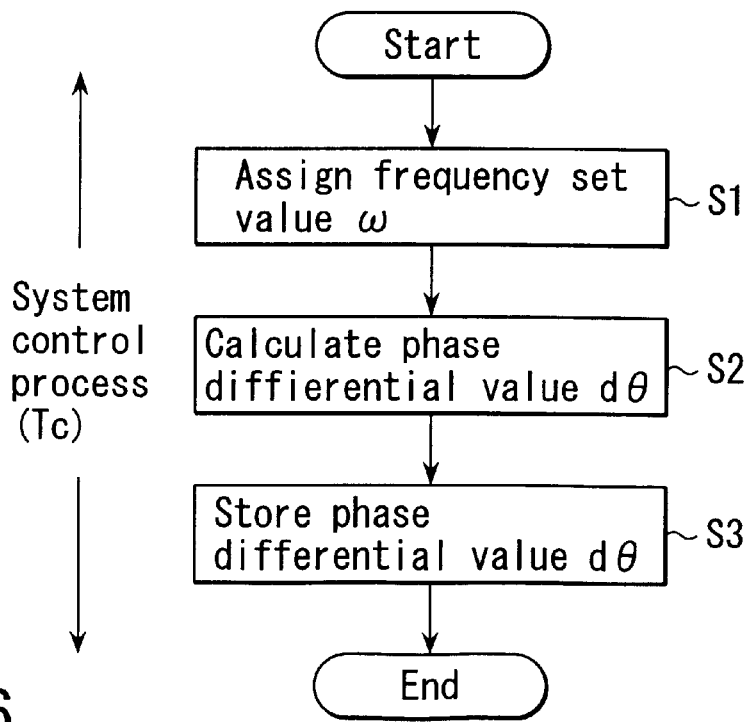
FIG. 6 is a flow diagram illustrating the timing setting procedure for the semiconductor switching element switching control in the system control process of the inverter device according to the embodiment of the present invention.

FIG. 6 is a flow diagram illustrating the timing setting procedure regarding the semiconductor switching element switching control in the system control process.

In step S1, the frequency set value ω is designated.

In step S2, the phase differential value dθ is calculated. More specifically, during the period of the timer interrupt processing cycle Ts, the phase differential value dθ indicating the phase increment amount for each of the processing cycles Ts on the basis of the frequency setting value ω can be calculated by the following equation:

$$d\theta = \omega \times Ts$$

In step S3, thus calculated phase differential value dθ is stored as a variable which can be referred to from outside.

Figure 7:
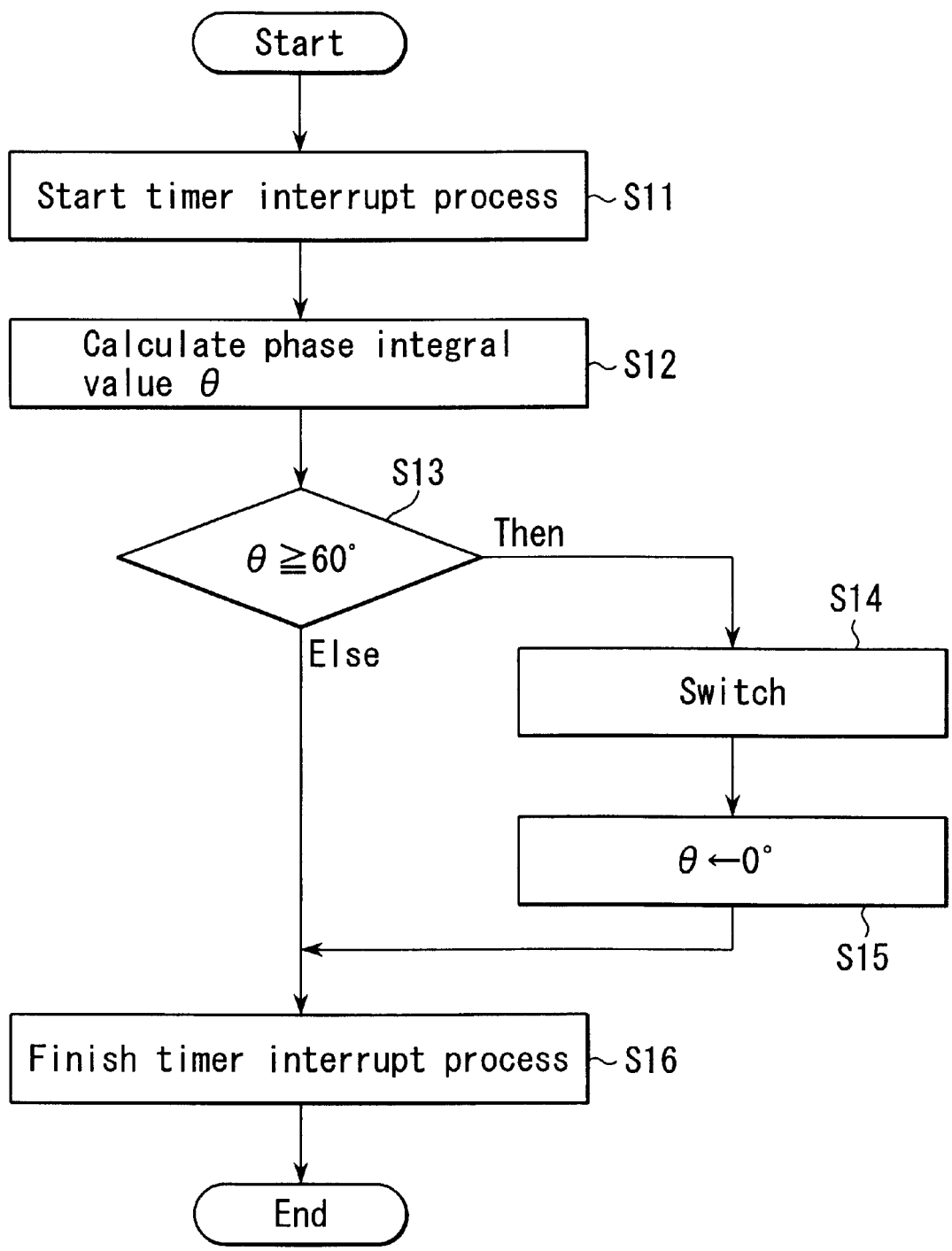
FIG. 7 is a flow diagram illustrating the processing operation of the switching control in the timer interrupt process of the inverter device according to the embodiment of the present invention.

FIG. 7 is a flow diagram illustrating the processing operation of the switching control in the timer interrupt process carried out at a constant processing cycle Ts.

In step S11, the timer interrupt process is started.

In step S12, the present phase integral value θ is calculated by adding thus stored phase integral value θ each time the timer interrupt occurs.

In step S13, it is determined whether or not the switching control is required by determining if the calculated present phase integral value θ is 60° or larger.

In step S14, the switching control is carried out.

In step S15, the present phase integral value θ is reset to zero. Then, an interval of 60° is inserted until the next switching.

In step S16, the timer interrupt process is finished.
(Operation)

The switching control is carried out at a constant processing cycle Ts by the timer interrupt process. With this operation, the accuracy of the inverter output frequency fo is improved and stabilized. More specifically, with employment of the digital control processing mode shown in FIG. 5, the timing for the ON-OFF switching control of the six semiconductor switching elements 5 to 10 is controlled by an independent and constant processing cycle Ts which is not directly related to the processing cycles Tc1, Tc2, ... of the system control in the processor 30. As a result, even if a personal computer or a general-use microcomputer board are used, the output frequency fo can be controlled stably and at a high accuracy. For example, when various parameters are displayed on the screen during the system control processing with use of the personal computer, the timer interrupt process at a constant and relatively short processing cycle Ts is carried out even when the system control processing speed is unknown. With this operation, it is possible to determine whether or not the switching control is required at a high accuracy of a certain level or higher, and accordingly a stable output frequency accuracy can be maintained.

In the meantime, there is provided means for determining whether or not the switching control is required on the basis of the current phase obtained by converting the frequency set value ω into a phase increment amount to be set in the timer interrupt cycle Ts, and totalizing the set value in the timer interrupt process, thus grasping the current phase. More specifically, as shown in FIGS. 6 and 7, the phase differential value dθ is first calculated on the basis of the frequency set value ω. Then, the phase differential value dθ is added up (totalized) in the timer interrupt process to obtain the present phase integral value θ. Finally, on the basis of thus obtained phase integral value θ, it is determined whether or not the switching control is required. Therefore, a high output frequency control accuracy can be maintained. Consequently, even in, for example, an accelerating stage or decelerating stage, in which the frequency command fos varies, an accurate present phase can be obtained and therefore the control accuracy for the output frequency will not be decreased.

According to the present invention, it is possible to provide an inverter having the following advantages.

That is, in the case where the switching control of the inverter inverse conversion circuit is carried out by a digital processor, the timer interrupt process is assigned and the timing for the switching control is determined within the interrupt process. Thus, it is possible to supply an alternating current output having a highly accurate and stable frequency, regardless of the processing cycle of the system control by the processor.

Further, there is provided means for determining whether or not the switching control is required on the basis of the current phase obtained by converting the frequency set value into a phase increment amount to be set in the timer interrupt cycle, and totalizing the set value in the timer interrupt process, thus grasping the current phase. With this structure, the frequency control accuracy is not lowered even if the output frequency is varied as in, for example, an acceleration or deceleration.

What is claimed is:

1. An inverter device comprising an inverse conversion circuit which converts a supplied direct-current electricity into a alternating-current electricity having a predetermined frequency, for driving a power source motor for a rotary machine, at various speeds, in which the switching control of the inverse conversion circuit is performed by a digital processor, said inverter device characterized in that a timer interrupt process having an independent constant processing cycle which is not directly related to the processing cycle of the system control in the digital processor is assigned and whether or not switching of the inverse conversion circuit is required in the timer interrupt process is determined, and the switching control is carried out on the basis of the determination, thereby controlling the inverter output frequency.

2. An inverter device according to claim 1, characterized in that the constant processing cycle in the timer interrupt process is set shorter than an average processing cycle in the system control.

3. An inverter device according to claim 1, characterized by comprising means for determining whether or not the switching control is required on the basis of a present phase obtained by converting the frequency set value into a phase increment amount to be set in the timer interrupt cycle, and totalizing the set value in the timer interrupt process, thus grasping the current phase.

* * * * *